United States Patent
Chanda et al.

(10) Patent No.: US 10,230,576 B2
(45) Date of Patent: Mar. 12, 2019

(54) MANAGING ADMINISTRATIVE STATUSES OF HARDWARE VTEPS

(71) Applicant: Nicira, Inc., Palo Alto, CA (US)

(72) Inventors: Anupam Chanda, San Jose, CA (US); Pankaj Thakkar, Cupertino, CA (US)

(73) Assignee: NICIRA, INC., Palo Alto, CA (US)

(*) Notice: Subject to any disclaimer, the term of this patent is extended or adjusted under 35 U.S.C. 154(b) by 228 days.

(21) Appl. No.: 15/045,213

(22) Filed: Feb. 16, 2016

(65) Prior Publication Data

US 2017/0093617 A1 Mar. 30, 2017

Related U.S. Application Data

(60) Provisional application No. 62/234,953, filed on Sep. 30, 2015.

(51) Int. Cl.
*G06F 15/177* (2006.01)
*H04L 12/24* (2006.01)
*H04L 29/06* (2006.01)

(52) U.S. Cl.
CPC ........ *H04L 41/082* (2013.01); *H04L 41/0672* (2013.01); *H04L 63/145* (2013.01)

(58) Field of Classification Search
CPC ... H04L 41/082; H04L 41/12; H04L 41/0672; H04L 63/145
USPC .................................................. 709/223–225
See application file for complete search history.

(56) References Cited

U.S. PATENT DOCUMENTS

| | | | |
|---|---|---|---|
| 5,526,484 A | 6/1996 | Casper et al. | |
| 5,751,967 A | 5/1998 | Raab et al. | |
| 6,243,394 B1 | 6/2001 | Deng | |
| 6,640,251 B1 | 10/2003 | Wiget et al. | |
| 6,850,529 B1 | 2/2005 | Wong | |
| 7,463,639 B1 | 12/2008 | Rekhter | |
| 7,933,198 B1 | 4/2011 | Pan | |
| 7,937,438 B1 | 5/2011 | Miller et al. | |
| 8,046,456 B1 | 10/2011 | Miller et al. | |

(Continued)

FOREIGN PATENT DOCUMENTS

| | | |
|---|---|---|
| EP | 1154601 A1 | 11/2001 |
| EP | 1653688 A1 | 5/2006 |

(Continued)

OTHER PUBLICATIONS

Pfaff, Ben, et al., "The Open vSwitch Database Management Protocol," draft-pfaff-ovsdb-proto-00, Aug. 20, 2012, 34 pages, available at http:tools.ietf.orghtmldraft-pfaff-ovsdb-proto-00.

(Continued)

*Primary Examiner* — Duyen M Doan

(74) *Attorney, Agent, or Firm* — Adeli LLP

(57) ABSTRACT

Some embodiments provide a novel method for a network control system (or controllers of the network control system) to manage a set of hardware Virtual Tunnel End Points (VTEPs) used to implement a logical network. Many network devices or entities (such as interfaces or transport nodes) have a functionality to mark the device or entity as "administratively down". In that mode, such a device does not participate in any further forwarding in the dataplane, until it is marked as administratively up. This feature is often used to troubleshoot networks, and/or to remove misbehaving or faulty devices.

21 Claims, 8 Drawing Sheets

(56) References Cited

U.S. PATENT DOCUMENTS

| | | |
|---|---|---|
| 8,161,095 B2 | 4/2012 | Manion et al. |
| 8,345,688 B2 | 1/2013 | Zhou et al. |
| 8,386,642 B2 | 2/2013 | Elzur |
| 8,589,919 B2 | 11/2013 | Smith et al. |
| 8,874,876 B2 | 10/2014 | Bhadra et al. |
| 8,897,134 B2 | 11/2014 | Kern et al. |
| 8,943,490 B1 | 1/2015 | Jain et al. |
| 8,964,528 B2 | 2/2015 | Casado et al. |
| 9,014,181 B2 | 4/2015 | Lakshman et al. |
| 9,032,095 B1 | 5/2015 | Traina et al. |
| 9,100,285 B1 | 8/2015 | Choudhury et al. |
| 9,130,870 B1 | 9/2015 | Swierk et al. |
| 9,154,433 B2 | 10/2015 | Koponen et al. |
| 9,306,843 B2 | 4/2016 | Koponen et al. |
| 9,319,375 B2 | 4/2016 | Gross, IV et al. |
| 9,331,940 B2 | 5/2016 | Balus et al. |
| 9,369,426 B2 | 6/2016 | Koponen et al. |
| 9,397,946 B1 | 7/2016 | Yadav |
| 9,455,901 B2 | 9/2016 | Davie et al. |
| 9,485,149 B1 | 11/2016 | Traina et al. |
| 9,577,927 B2 | 2/2017 | Hira et al. |
| 9,621,461 B2 | 4/2017 | Sun |
| 9,633,040 B2 | 4/2017 | Lee |
| 9,667,541 B2 | 5/2017 | Song |
| 9,699,070 B2 | 7/2017 | Davie et al. |
| 9,755,965 B1 * | 9/2017 | Yadav ................. H04L 45/54 |
| 9,819,581 B2 | 11/2017 | Chanda et al. |
| 9,847,938 B2 | 12/2017 | Chanda et al. |
| 9,923,815 B2 * | 3/2018 | Assarpour .............. H04L 45/74 |
| 2002/0065919 A1 | 5/2002 | Taylor et al. |
| 2002/0093952 A1 | 7/2002 | Gonda |
| 2003/0041170 A1 | 2/2003 | Suzuki |
| 2003/0163645 A1 | 8/2003 | Tremblay et al. |
| 2004/0267866 A1 | 12/2004 | Carollo et al. |
| 2005/0262132 A1 | 11/2005 | Morita et al. |
| 2006/0092940 A1 | 5/2006 | Ansari et al. |
| 2007/0028039 A1 | 2/2007 | Gupta et al. |
| 2008/0189769 A1 | 8/2008 | Casado et al. |
| 2008/0215586 A1 | 9/2008 | Pruet |
| 2009/0006603 A1 * | 1/2009 | Duponchel ......... H04L 12/4641 709/223 |
| 2009/0150527 A1 | 6/2009 | Tripathi et al. |
| 2009/0161547 A1 | 6/2009 | Riddle et al. |
| 2011/0026521 A1 | 2/2011 | Gamage et al. |
| 2011/0075674 A1 | 3/2011 | Li et al. |
| 2011/0090911 A1 | 4/2011 | Hao et al. |
| 2011/0206047 A1 | 8/2011 | Donthamsetty et al. |
| 2011/0286326 A1 | 11/2011 | Awano |
| 2011/0299537 A1 | 12/2011 | Saraiya et al. |
| 2011/0317559 A1 | 12/2011 | Kern et al. |
| 2012/0011106 A1 | 1/2012 | Reid et al. |
| 2012/0147898 A1 | 6/2012 | Koponen et al. |
| 2012/0236761 A1 | 9/2012 | Yang et al. |
| 2012/0278802 A1 | 11/2012 | Nilakantan et al. |
| 2012/0290694 A9 | 11/2012 | Marl et al. |
| 2012/0303835 A1 | 11/2012 | Kempf et al. |
| 2013/0044636 A1 | 2/2013 | Koponen et al. |
| 2013/0058229 A1 | 3/2013 | Casado et al. |
| 2013/0058350 A1 | 3/2013 | Fulton |
| 2013/0058351 A1 | 3/2013 | Casado et al. |
| 2013/0103818 A1 | 4/2013 | Koponen et al. |
| 2013/0114466 A1 | 5/2013 | Koponen et al. |
| 2013/0121209 A1 | 5/2013 | Padmanabhan et al. |
| 2013/0132533 A1 | 5/2013 | Padmanabhan et al. |
| 2013/0223454 A1 * | 8/2013 | Dunbar ................. H04L 45/44 370/400 |
| 2013/0287026 A1 | 10/2013 | Davie |
| 2013/0315246 A1 | 11/2013 | Zhang et al. |
| 2013/0322453 A1 | 12/2013 | Allan |
| 2013/0329548 A1 | 12/2013 | Nakil et al. |
| 2014/0029451 A1 | 1/2014 | Nguyen |
| 2014/0029618 A1 | 1/2014 | Janardhanan |
| 2014/0071986 A1 | 3/2014 | Isobe |
| 2014/0101467 A1 | 4/2014 | Jubran et al. |
| 2014/0195666 A1 | 7/2014 | Dumitriu et al. |
| 2014/0201738 A1 | 7/2014 | Choi et al. |
| 2014/0229605 A1 | 8/2014 | Besser |
| 2014/0269709 A1 | 9/2014 | Benny et al. |
| 2014/0301391 A1 | 10/2014 | Krishnan et al. |
| 2015/0009992 A1 | 1/2015 | Zhang |
| 2015/0100560 A1 | 4/2015 | Davie et al. |
| 2015/0100675 A1 | 4/2015 | Davie et al. |
| 2015/0100704 A1 | 4/2015 | Davie et al. |
| 2015/0124586 A1 * | 5/2015 | Pani ................. H04L 12/18 370/219 |
| 2015/0124809 A1 | 5/2015 | Edsall et al. |
| 2015/0124821 A1 | 5/2015 | Chu et al. |
| 2015/0195178 A1 * | 7/2015 | Bhattacharya ........ H04L 45/745 718/1 |
| 2015/0215189 A1 * | 7/2015 | Lim ................... H04L 12/4633 370/252 |
| 2015/0281075 A1 * | 10/2015 | Park ..................... H04L 45/745 370/392 |
| 2015/0326425 A1 | 11/2015 | Natarajan et al. |
| 2015/0372906 A1 | 12/2015 | Tirat |
| 2015/0379150 A1 | 12/2015 | Duda |
| 2016/0014073 A1 | 1/2016 | Reddy et al. |
| 2016/0173535 A1 | 6/2016 | Barabash et al. |
| 2016/0197824 A1 | 7/2016 | Lin et al. |
| 2016/0212222 A1 | 7/2016 | Bultema et al. |
| 2016/0232019 A1 | 8/2016 | Shah et al. |
| 2016/0308690 A1 | 10/2016 | Chanda et al. |
| 2016/0352633 A1 * | 12/2016 | Kapadia ................. H04L 45/64 |
| 2016/0380812 A1 | 12/2016 | Chanda et al. |
| 2017/0034002 A1 | 2/2017 | Sinn |
| 2017/0034051 A1 | 2/2017 | Chanda et al. |
| 2017/0034052 A1 | 2/2017 | Chanda et al. |
| 2017/0034053 A1 | 2/2017 | Chanda et al. |
| 2017/0063608 A1 | 3/2017 | Wang et al. |
| 2017/0085502 A1 | 3/2017 | Biruduraju |
| 2017/0093618 A1 | 3/2017 | Chanda et al. |
| 2017/0093636 A1 | 3/2017 | Chanda et al. |
| 2017/0093646 A1 | 3/2017 | Chanda et al. |
| 2017/0093686 A1 * | 3/2017 | Uttaro .................. H04L 45/021 |
| 2017/0093758 A1 | 3/2017 | Chanda |
| 2017/0126615 A1 | 5/2017 | Chanda et al. |
| 2017/0171055 A1 | 6/2017 | Wang et al. |
| 2017/0171077 A1 | 6/2017 | Chanda |
| 2017/0171078 A1 | 6/2017 | Chanda |
| 2017/0171113 A1 | 6/2017 | Chanda |
| 2017/0208097 A1 | 7/2017 | Kirby et al. |
| 2017/0317928 A1 | 11/2017 | Gude et al. |
| 2017/0366446 A1 | 12/2017 | Davie et al. |
| 2018/0007004 A1 | 1/2018 | Basler |
| 2018/0007005 A1 | 1/2018 | Chanda et al. |
| 2018/0026895 A1 | 1/2018 | Wang et al. |

FOREIGN PATENT DOCUMENTS

| | | | |
|---|---|---|---|
| JP | 2003069609 | | 3/2003 |
| WO | 2005112390 | A1 | 11/2005 |
| WO | 2008095010 | A1 | 8/2008 |

OTHER PUBLICATIONS

Graubner, Pablo, et al., "Cloud Computing: Energy-Efficient Virtual Machine Consolidation," IT Professional, Mar. 2013, 7 pages, vol. 15, Issue 2, IEEE.

* cited by examiner

US 10,230,576 B2

MANAGING ADMINISTRATIVE STATUSES OF HARDWARE VTEPS

BACKGROUND

There is a growing movement, driven by both industry and academia, towards a new network control paradigm called Software-Defined Networking (SDN). In Software-Defined Networking (SDN), a control plane implements and maintains the control logic that governs the forwarding behavior of shared network switching elements on a per user basis. A logical network that is implemented for a tenant of a hosting system is a good example of an SDN. The virtual (logical) network of a tenant of the hosting system connects a set of data compute nodes (e.g., virtual machines, etc.) that are assigned to the tenant, to each other and to other virtual and/or physical networks through a set of logical switches and logical routers.

Managing the various physical and logical elements involved with a logical network poses many difficulties. One of the challenges in today's hosting system networks arises in managing administrative statuses for hardware virtual tunnel end points (VTEPs) and their associated switching elements.

BRIEF SUMMARY

Some embodiments provide a novel method for a network control system (or controllers of the network control system) to manage a set of hardware Virtual Tunnel End Points (VTEPs) used to implement a logical network. Many network devices or entities (such as interfaces or transport nodes) have a functionality to mark the device or entity as "administratively down". In that mode, such a device does not participate in any further forwarding in the dataplane, until it is marked as administratively up. This feature is often used to troubleshoot networks, and/or to remove misbehaving or faulty devices.

In some embodiments, a user (e.g., network administrator, etc.) marks a device (e.g., a hardware VTEP, a physical switch managed by a hardware VTEP, or a port on a physical switch) as being up or down when adding a new transport node or entity into the system, or in order to troubleshoot problems in the system. The administrative status can be either up or down, indicating whether the marked device is available for service. Marking a device as being down allows the user to bring down parts of the network or to remove problem devices from the operations of the network. The marked devices will no longer transmit or receive network traffic for the logical network.

The method of some embodiments detects a problem with an entity (e.g., a malfunctioning forwarding element or a malicious compute node that is infected with a virus) in the logical network and updates an administrative status for a device (e.g., a hardware VTEP, a physical switch managed by a hardware VTEP, or a port on a physical switch) associated with the problem entity to mark the device as administratively down. In some embodiments, a single hardware VTEP gateway is associated with multiple physical switches.

In some embodiments, the method identifies a set of logical ports of problem entities in a logical network and a corresponding set of physical ports. The method then updates an administrative status at a VTEP for devices associated with the set of physical ports in order to halt further forwarding of network traffic of the identified set of logical ports. The method of some embodiments determines that the set of physical ports includes all of the physical ports of a network switch or a hardware VTEP, and updates the administrative status of the entire network switch or the hardware VTEP as administratively down. The hardware VTEPs of some embodiments are associated with multiple physical switches on the WIFE. In other cases, the method marks individual physical ports of the hardware VTEP as administratively down.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION OF THE INVENTION

Figure 1:
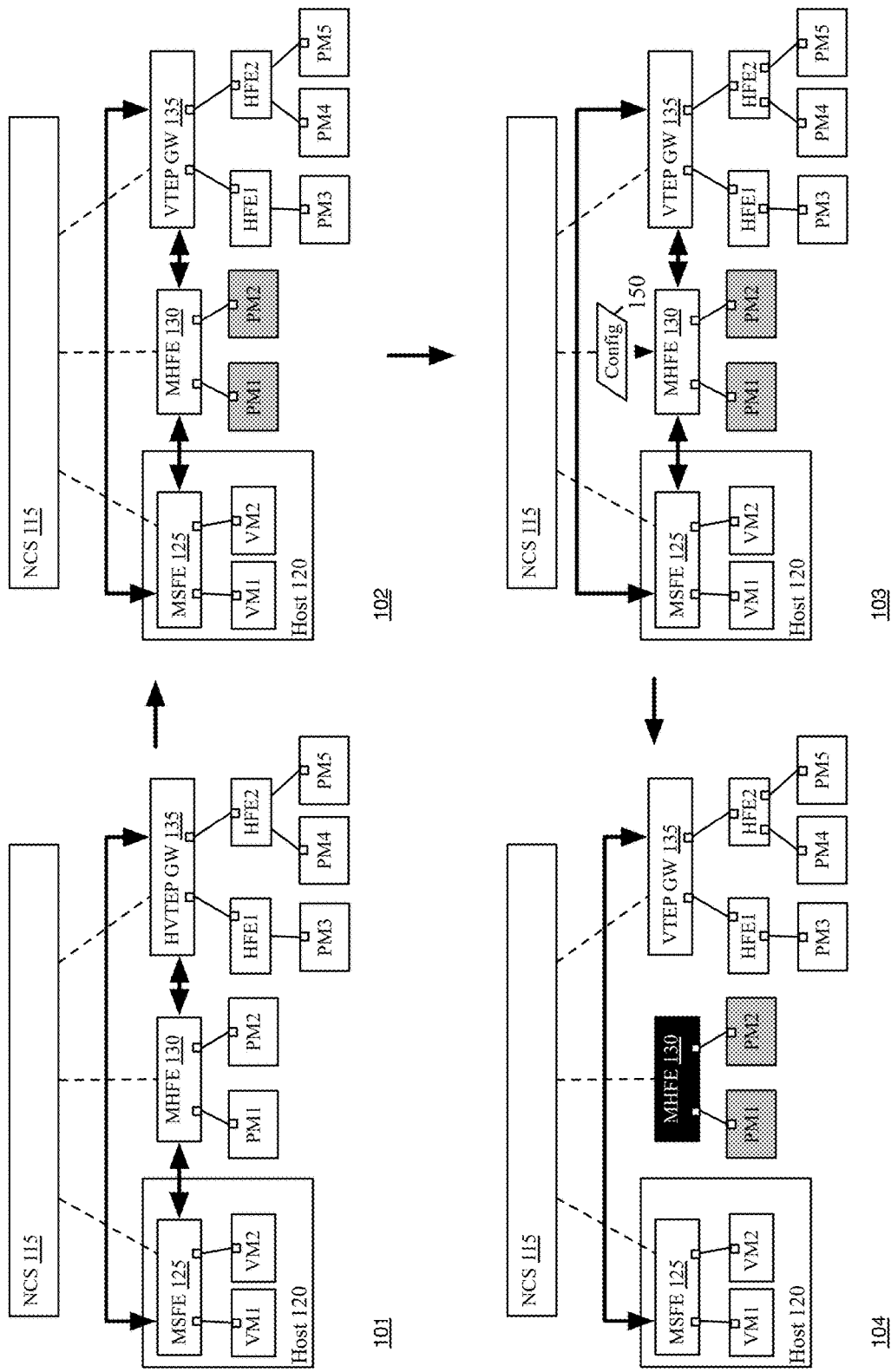
FIG. 1 illustrates an example of updating an administrative status of a VTEP.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a novel method for a network control system (or controllers of the network control system) to manage a set of hardware Virtual Tunnel End Points (VTEPs) for the tunnels (e.g., a Virtual Extensible LAN (VXLAN) tunnel, a Stateless Transport Tunneling (STT) tunnel, etc.) used to implement a logical network. Many network devices or entities (such as interfaces or transport nodes) have a functionality to mark the device or entity as "administratively down". In that mode, such a device does not participate in any further forwarding in the dataplane, until it is marked as administratively up. This feature is often used to troubleshoot networks, and/or to remove misbehaving or faulty devices.

In some embodiments, a user (e.g., network administrator, etc.) marks a device (e.g., a hardware VTEP, a physical switch managed by a hardware VTEP, or a port on a physical switch) as being up or down when adding a new transport node or entity into the system, or in order to troubleshoot problems in the system. The administrative status can be either up or down, indicating whether the marked device is available for service. Marking a device as being down allows the user to bring down parts of the network or to remove problem devices from the operations of the network. The marked devices will no longer transmit or receive network traffic for the logical network.

The method of some embodiments detects a problem with an entity (e.g., a malfunctioning forwarding element or a malicious compute node that is infected with a virus) in the logical network and updates an administrative status for a device (e.g., a hardware VTEP, a physical switch managed by a hardware VTEP, or a port on a physical switch) associated with the problem entity to mark the device as administratively down. In some embodiments, a single hardware VTEP gateway is associated with multiple physical switches.

In some embodiments, the method identifies a set of logical ports of problem entities in a logical network and a corresponding set of physical ports. The method then updates an administrative status at a VTEP for devices associated with the set of physical ports in order to halt further forwarding of network traffic of the identified set of logical ports. The method of some embodiments determines that the set of physical ports includes all of the physical ports of a network switch or a hardware VTEP, and updates the administrative status of the entire network switch or the hardware VTEP as administratively down. The hardware VTEPs of some embodiments are associated with multiple physical switches on the MHFE. In other cases, the method marks individual physical ports of the hardware VTEP as administratively down.

FIG. 1 illustrates an example of updating an administrative status of a VTEP in four stages 101-104. The first stage 101 shows a physical network with a network control system 115 that manages (as illustrated with dashed lines) a managed software forwarding element (MSFE 125), a managed hardware forwarding element (MHFE 130), and a hardware VTEP gateway (VTEP GW 135). The managed elements (MSFE 125, MHFE 130, and VTEP gateway 135) are VTEPs for the tunnels (indicated as thick black arrows), which are used to tunnel logical network data for a logical network that connects the end machines (i.e., virtual machines VM1-VM2 and physical machines PM1-PM5).

A logical network logically connects a set of end machines (e.g., virtual machines, physical servers, containers, etc.) and a set of physical machines (and other resources of the physical network) using a set of logical forwarding elements (e.g., logical L2 and L3 switches). This allows the physical resources of a physical network to be allocated and shared while maintaining a logical separation between the end machines of the different logical networks. The relationship between the physical network, as shown, and the logical network will be described in further detail below with reference to FIG. 2.

The network control system 115 of some embodiments configures and manages virtual tunnel end points (VTEPs) for both software forwarding elements and hardware forwarding elements to implement one or more logical networks (e.g., for one or more tenants of a hosting system (e.g., a datacenter or multiple datacenters)). The VTEPs tunnel logical network data through a network (e.g., the Internet) between the VTEPs for the end machines. VTEPs and the tunnels will be described in further detail below with reference to FIGS. 3a-b.

The network control system 115 of some embodiments includes a set of controllers that perform various functions for implementing the logical network. Although shown as separate from the host machine 120, in some embodiments the network control system 115 includes local controllers that operate within the host machine 120 (e.g., within a virtual machine operating on the hypervisor) and/or within the MHFE 130 and hardware VTEP gateways 135.

The MSFE 125 operates in a host machine 120. In some embodiments, the MSFE 125 is a virtual switch (e.g., Open vSwitch, etc.) that operates in a hypervisor of the host machine 120. In some embodiments, MSFE 125 is a virtual switch that connects to a set of compute nodes (or end machines), shown as virtual machines VM1-VM2, which operate on the hypervisor (not shown) of the host machine 120. In some embodiments, the end machines include other types of data compute nodes (e.g., namespaces, containers, etc.) that may connect to the MSFE 125.

The MHFE 130 of some embodiments is a hardware forwarding element that is managed by the network control system to implement the logical network. The MHFE 130 of some embodiments is a third-party hardware switch, such as a top-of-rack (TOR) switch, that can be managed based on a standardized configuration database protocol (e.g., OVSDB protocol). The MHFE 130 attaches to hardware machines (e.g., third-party servers connected to a TOR switch, computers, printers, etc.) to exchange network data with other end machines and/or external networks that are connected to the logical network.

In some embodiments, the managed forwarding elements 125 and 130 are configured to perform duties as both VTEPs and as forwarding elements, encapsulating and decapsulating the logical network data of the end machines and forwarding the data to the end machines. In some cases, a separate VTEP gateway is used to tunnel network data for multiple forwarding elements to end machines at other VTEPs.

The hardware VTEP gateway 135 of some embodiments is a hardware device that provides the VTEP functionality to a set of hardware forwarding elements (e.g., switches). The VTEP gateway 135 connects to hardware forwarding elements HFE1 and HFE2 and tunnels logical network data for end machines (PM3-PM5) attached to HFE1 and HFE2. The hardware VTEP gateway 135 of some embodiments uses a single configuration database instance for all of the forwarding elements for which it provides VTEP services.

In some embodiments, the end machines (PM3-PM5) include host machines for VMs that operate on legacy hypervisors of the host machines. The legacy hypervisors of some embodiments do not support logical networks and/or tunneling. In some such embodiments, the legacy hypervisor operating on a host machine (i.e., one of the end machines (PM3-PM5)) sends the network traffic for the VMs operating on the host machine to the MHFE 230 to perform tunneling and logical processing for the VMs operating on the host machine.

The network control system 115 of some embodiments configures the VTEPs for managed forwarding elements 125 and 130 and VTEP gateway 135 using various different protocols (e.g., NETCPA protocol, Open vSwitch Database Management (OVSDB) protocol, OpenFlow protocol, etc.).

In some embodiments, the network control system 115 configures the VTEPs (e.g., MHFE 130 and VTEP gateway 135) by modifying the tables of a configuration database for the hardware VTEPs.

One of ordinary skill in the art would realize that the number of various elements (e.g., host machines, MSFEs, MHFEs, VTEP gateways, end machines, etc.) illustrated in the figure are exemplary and a logical network for a tenant of a hosting system may span a multitude of host machines and third-party devices, and logically connect a large number of end machines to each other and to several other third-party devices. The end machines and devices of some embodiments are located in multiple datacenters in multiple geographic locations.

In the second stage 102, physical machines PM1 and PM2 have been identified as having a problem. For example, an administrator may determine that the machines are malicious (e.g., infected with a virus) or otherwise malfunctioning and need to be halted from further communication with the logical network.

However, current implementations for marking a hardware VTEP as being administratively down are inefficient. In some embodiments, the network control system 115 configures the hardware VTEPs (e.g., MHFE 130 and VTEP gateway 135) using a configuration database protocol (e.g., OVSDB protocol) that is unable to direct a hardware VTEP to halt its operations. Rather, the network control system is forced 115 to undo all of the transactions performed with the hardware VTEP, potentially having to delete millions of rows in the configuration databases of the hardware VTEPs. With such large transactions, it is often not possible to perform the deletion in a single transaction, forcing the network control system to issue multiple transactions in a series of steps. During the series of steps, the hardware VTEPs could continue to participate in the forwarding of logical network data, but may have an incomplete and incorrect version of the forwarding state as the entries in the configuration database (i.e., VTEP database) are being deleted.

In order to address these limitations, some embodiments provide a modified configuration database schema to make the update process more efficient. In some embodiments, the modified configuration database schema provides a global administrative status field (e.g., a Boolean field), which can be administratively up or down (true or false) for a hardware VTEP. This is a global administrative status flag that affects all of the switches and all of the ports of the hardware VTEP database. In some embodiments, the configuration database includes a table (i.e., the global table in the OVSDB schema) with a single record for managing the VTEP. The schema of some embodiments is modified to include a Boolean field for the administrative status flag.

The third stage 103 shows that the network control system 115 sends a configuration message 150 to MHFE 130. However, rather than simply deleting all of the forwarding state, the network control system 115 of the invention updates a global administrative status variable in the modified database schema for the hardware VTEP itself, marking the hardware VTEP as unavailable in a single step (by updating a single field in a VTEP table) and avoiding any inconsistencies in the forwarding state.

The fourth stage 104 shows that MHFE 130 has been marked as administratively down (shown in black). The VTEP for the down MHFE 130 no longer has tunnels to the MSFE 120 and the hardware VTEP gateway 135. In some embodiments, marking the VTEP for MHFE 130 as administratively down simply makes the physical machines PM1 and PM2 unavailable to the other machines in the logical network. The VTEPs for the other machines will no longer use the tunnels to the down VTEP.

Figure 2:
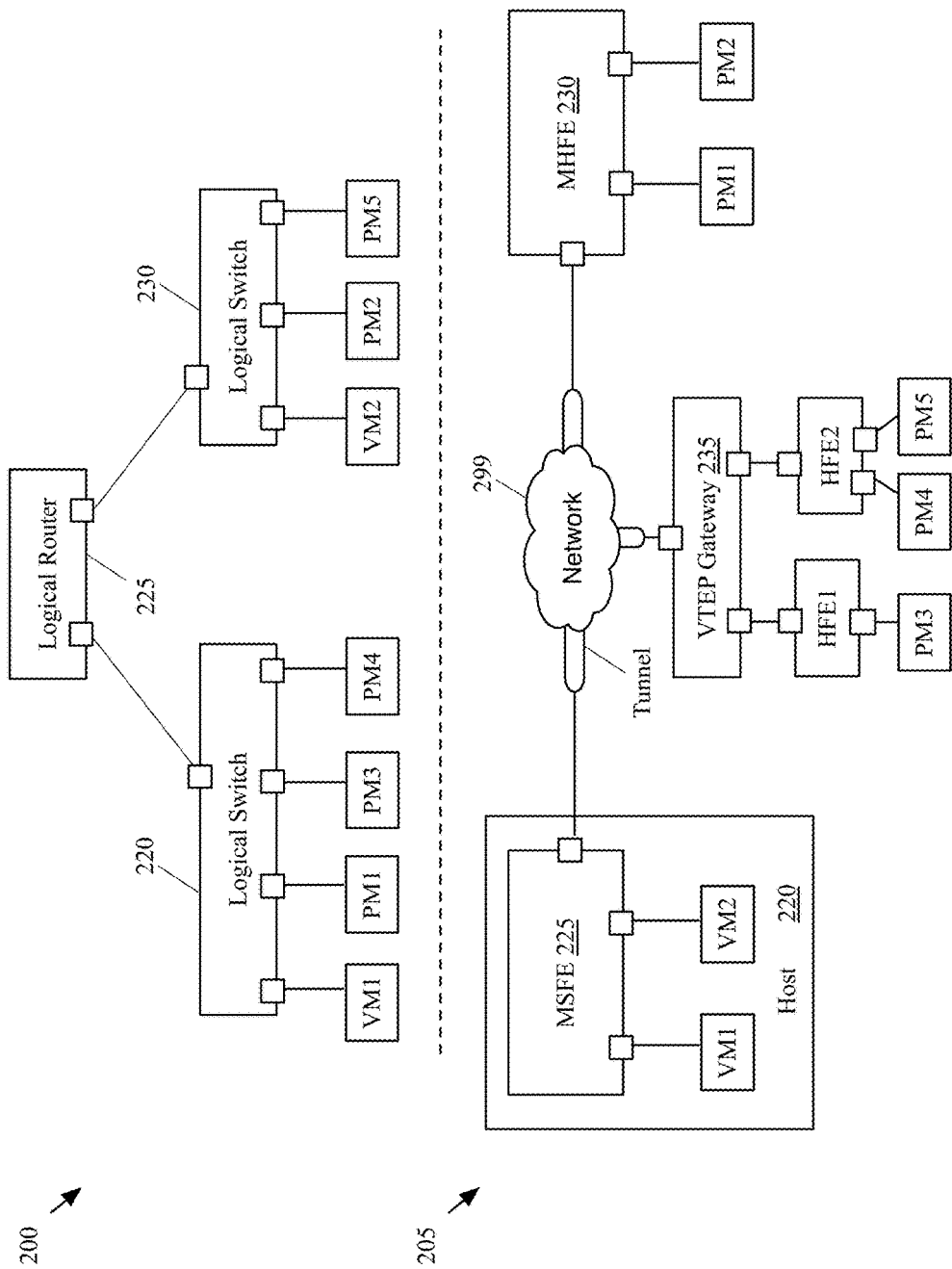
FIG. 2 conceptually illustrates an example of a logical network that is implemented on a physical network.

The network control system manages the VTEPs for the managed forwarding elements MSFE 125 and MHFE 130, and for hardware VTEP gateway 135 in a physical network, in order to implement a logical network. FIG. 2 conceptually illustrates an example of a logical network that is implemented on a physical network. This figure shows end machines (VMs 1-4 and PM5) that are logically connected according to a logical network 200, while being physically connected according to a physical network 205. In particular, this figure shows an example of a logical network that could be implemented on a physical network, such as the one described with reference to FIG. 1.

The logical network 200 includes three logical forwarding elements (a logical router 225 and two logical switches 220 and 230) that describe the desired forwarding behaviors for the end machines VM1, VM2, and PM1-PM5 in the logical network. In some embodiments, the network control system 200 receives the definition of a set of logical forwarding elements of the logical network from a user (e.g., a network administrator, a tenant of a datacenter, etc.) and modifies forwarding behaviors of the physical forwarding elements according to the forwarding logic of the set of logical forwarding elements.

End machines VM1, PM1, PM3, and PM4 are connected through logical ports to a first logical switch 220. End machines VM2, PM2, and PM5 are connected through logical ports of a second logical switch 230. The two logical switches 220 and 230 are connected to ports of a logical router 225.

The physical network 205 shows the actual physical connections between the end machines VM1, VM2, and PM1-PM5. Physical network 205, like the example of FIG. 1, shows a host machine 220, MHFE 230, and a hardware VTEP gateway 235. Host machine 220 has MSFE 225, which connects to VM1 and VM2, which are virtual machines that operate on virtualization software that executes on the host machine 220. MHFE 230 (a hardware forwarding element) connects to two physical machines PM1 and PM2 (e.g., server, bare-metal machine, etc.) that are attached to physical ports of the MHFE 230. The hardware VTEP gateway 235 connects to two hardware forwarding elements (e.g., switches) HFE1 and HFE2, which in turn connect to PM3, and PMs 4 and 5 respectively.

MSFE 225, MHFE 230, and the hardware VTEP gateway 235 are connected to each other by tunnels through a network 299. The connections of the end machines to the logical switches as well as the connections of the logical switches to the logical router are defined using logical ports, which are mapped to the physical ports of the MSFE 225 and MHFE 230, as well as to the physical ports of HFE1 and HFE2, which are connected to hardware VTEP gateway 235.

The connections in the logical network differ from the connections of the physical network. For example, although end machines VM1, PM1, PM3, and PM4 are connected to a single logical switch 220 in the logical network 200, they are all physically connected to different forwarding elements (i.e., MSFE 225, MHFE 230, HFE1, and HFE2) in the physical network 205. The MSFE 225, MHFE 230, and the hardware VTEP gateway could reside in different machines, different subnets, or even different datacenters in different parts of the world. The VTEPs (i.e., MSFE 225, MHFE 230, and VTEP gateway 235) implement the logical network by creating tunnels for communicating logical network data to other forwarding elements.

The network control system of some embodiments configures the forwarding elements of the physical network to implement the logical forwarding elements of the logical network by creating tunnels and modifying forwarding behaviors of the managed forwarding elements. In some embodiments, the MSFE 225, MHFE 230, and hardware VTEP gateway 235 of the physical network 205 implement the LFEs 220-230 by storing a set of flow entries at the physical forwarding elements for routing the packets of the logical network. Alternatively, or conjunctively, some or all of the managed forwarding elements are not flow-based software forwarding elements, but instead process packets based on configuration data that is generated by local controllers of the network control system.

Although, in the illustrated example, each managed forwarding element implements logical forwarding elements for a single logical network, in some embodiments, a managed forwarding element may be attached to machines for logical forwarding elements of different logical network. A single managed forwarding element can be configured to implement different logical networks for different tenants.

Figure 3A:
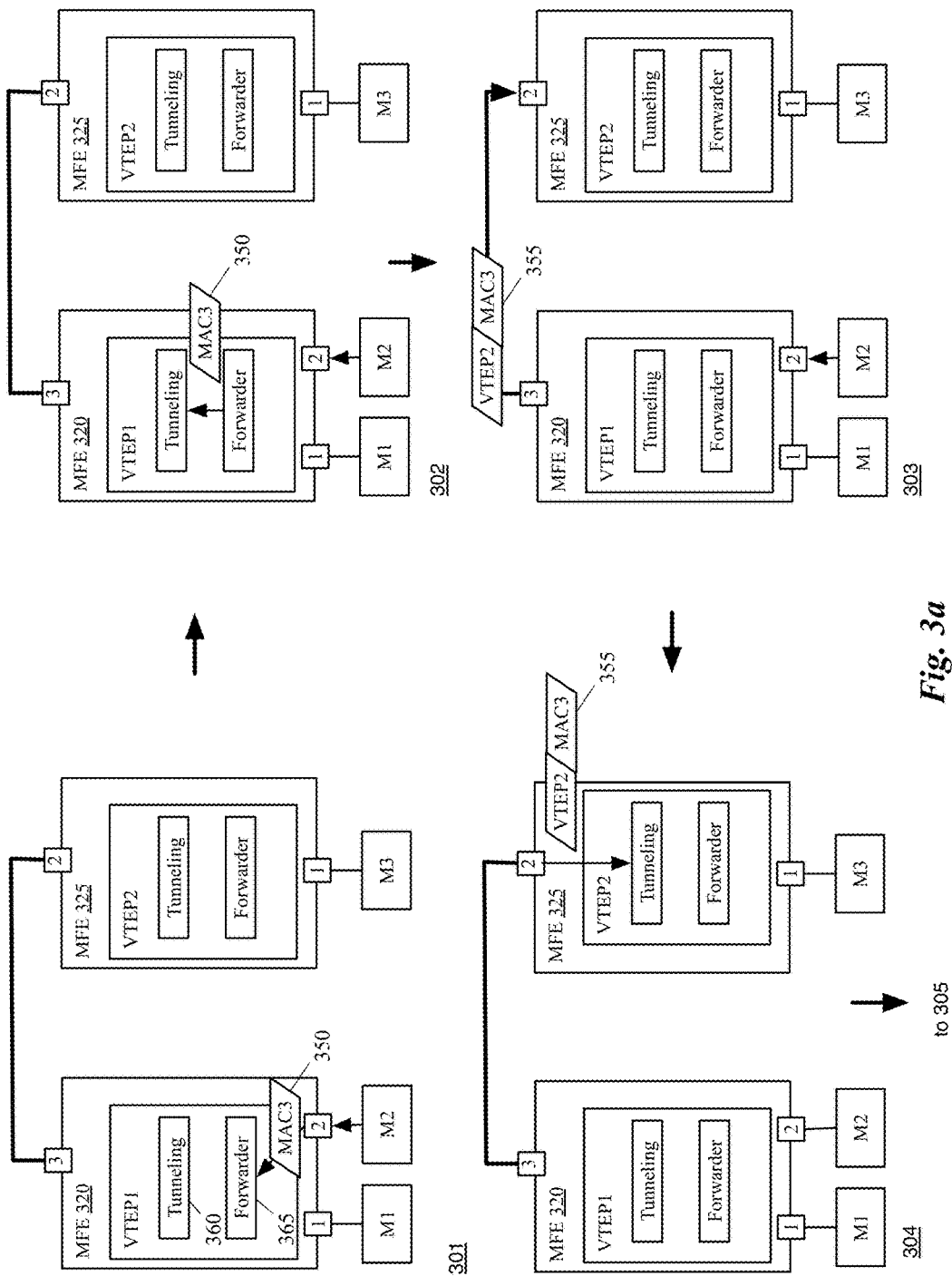
FIGS. 3a-b illustrate an example of the tunneling performed by the VTEP of an MHFE for packets through a logical network.
Figure 3B:
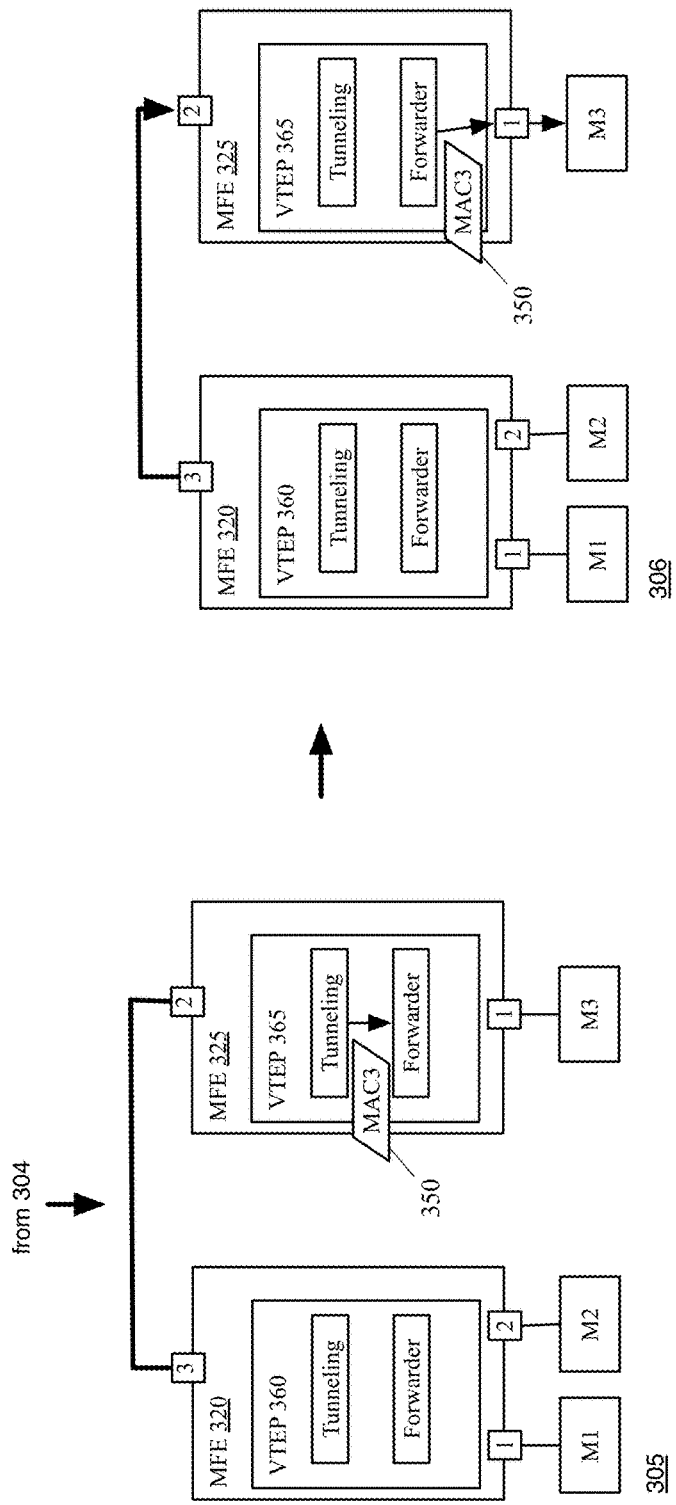

The logical network of some embodiments communicate logical network data between the physical forwarding elements by creating tunnels between virtual tunnel end points (VTEPs) for end machines of the logical network. FIGS. 3a-b illustrate an example of the tunneling performed by the VTEP of an MHFE for packets through a logical network in six stages 301-306. This example shows two managed forwarding elements (MFEs) 320 and 325 with virtual tunnel end points VTEPs 1 and 2 respectively. Each VTEP shows a tunneling module 360 and a forwarder 365. Machines M1 and M2 (e.g., virtual machines, containers, hardware servers, etc.) are coupled to MFE 320, while machine M3 is coupled to MFE 325. The MFEs (e.g., hardware and/or software MFEs) 320 and 325 communicate logical network data through tunnels in the network.

The first stage 301 shows that machine M2 sends a data message 350 through port 2 of the MHFE 320 with a destination address MAC2. When the data message 350 is destined for another machine that is coupled to the MHFE 320, the forwarder 365 forwards the data message directly to the destination machine, without encapsulating the data message.

In this example, the forwarder 365 determines that the destination machine for the data message 350 is not located on the same MHFE 320. In some embodiments, the forwarder 365 determines whether a destination address is located on the same MHFE 320 based on a set of database configuration tables (not shown) that provide mappings between the logical and physical networks. The mappings of some embodiments identify the VTEP to which each logical port is connected. So, for example, if the data message 350 had a destination address of MAC1, which corresponds to the physical port of machine M1 on MHFE 320, then the forwarder 365 would send the packet directly to machine M1.

The second stage 302 shows that the forwarder 365 sends the data message 350 to a tunneling module 360, which performs tunneling for data messages through the network. In the second stage 302, the tunneling module performs a lookup on the configuration database tables to identify a location (i.e., the IP address) of the remote VTEP VTEP2 for the destination end machine M3, and encapsulates the data message 350 with headers that direct the data message 350 to the remote VTEP2.

The third stage 303 shows that the tunneling module 360 of VTEP1 has attached a new header, which indicates the network layer address (VTEP2) for the destination VTEP (VTEP2) of the MFE 325 that is attached to the destination machine M3. In the fourth stage 304, MFE 320 sends encapsulated data message 355 through the network to the destination VTEP (VTEP2). The destination VTEP receives the encapsulated data message 355 through port 3 of the MFE 325.

The fifth stage 305 shows that the tunneling module 360 of the destination VTEP2 removes the header from the encapsulated data message 355 and sends the decapsulated data message 350 to the forwarder 365. Finally, in the sixth stage 306, the forwarder 365 sends the data message 350 to the destination machine M3.

As described above, because end machines and forwarding elements of the network may require maintenance or troubleshooting, it may be desirable to mark a hardware VTEP as administratively down. However, while in some cases, marking a hardware VTEP (e.g., a MHFE or a hardware VTEP gateway) as administratively down (as described above with reference to FIG. 1) is effective, some embodiments of the invention provide finer grain controls for marking network elements as administratively down.

Figure 4:
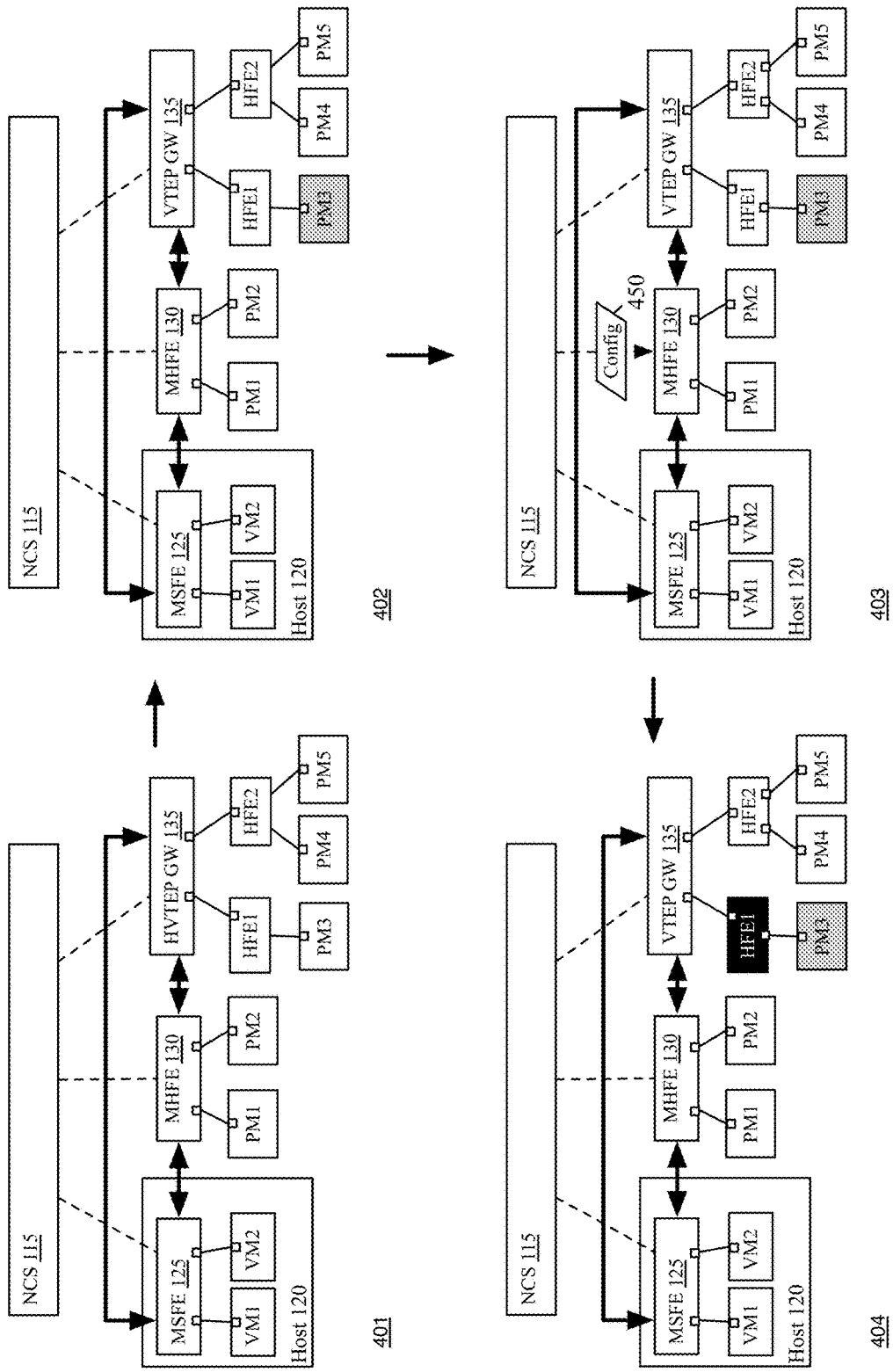
FIG. 4 illustrates an example of updating an administrative status of a physical switch.

FIG. 4 illustrates an example of updating an administrative status of a physical switch in four stages 401-404. Like the first stage 101 of FIG. 1, the first stage 401 shows the network control system 115 that manages MSFE 125, MHFE 130, and hardware VTEP gateway 135, which are virtual tunnel end points (VTEPs) for the tunnels (indicated as thick black arrows). VTEPs encapsulate and decapsulate data messages for a logical network through an overlay network.

In the second stage 402, physical machine PM3 has been identified as having a problem. For example, an administrator may determine that the machine is malicious or otherwise malfunctioning and need to be halted from further communication with the logical network. As shown, physical machine PM3 is connected to a hardware forwarding element HFE1, which connects to a hardware VTEP gateway 115.

The third stage 403 shows that the network control system 115 sends a configuration message 450 to the hardware VTEP gateway 135. However, unlike the example of FIG. 1, rather than disabling the entire VTEP, the network control system 115 only disables HFE1. The network control system 115 uses the configuration database protocol (e.g., OVSDB protocol) to update an administrative status variable in the modified database schema.

In this case, the modified database schema includes an administrative status variable for each individual physical switch (i.e., HFE1 and HFE2) connected to the VTEP 135. The single variable for each switch allows the network control system 115 to mark individual physical switches as unavailable in a single step (by updating a single field in a physical switch table), avoiding any inconsistencies in the forwarding state. In some embodiments, the configuration database includes a table (i.e., the Physical Switch table in the OVSDB schema) for each individual physical switch served by the hardware VTEP. The schema of some embodiments is modified to include a Boolean field for the administrative status flag.

The fourth stage 404 shows that HFE1 for PM3 has been marked as administratively down (shown in black), but the other hardware forwarding element HFE2 is still operational. The hardware VTEP gateway 135 maintains the tunnels to the MSFE 120 and the MHFE 130 for the logical network data of PM4 and PM5 on HFE2. In some embodiments, the network control system 115 does not do anything directly to HFE1, but simply marks the port of the hardware VTEP gateway to which HFE1 is attached as administratively down.

Finally, some embodiments provide even finer grain controls that allow the network control system to mark individual ports of the physical switches as being administratively down.

Figure 5:
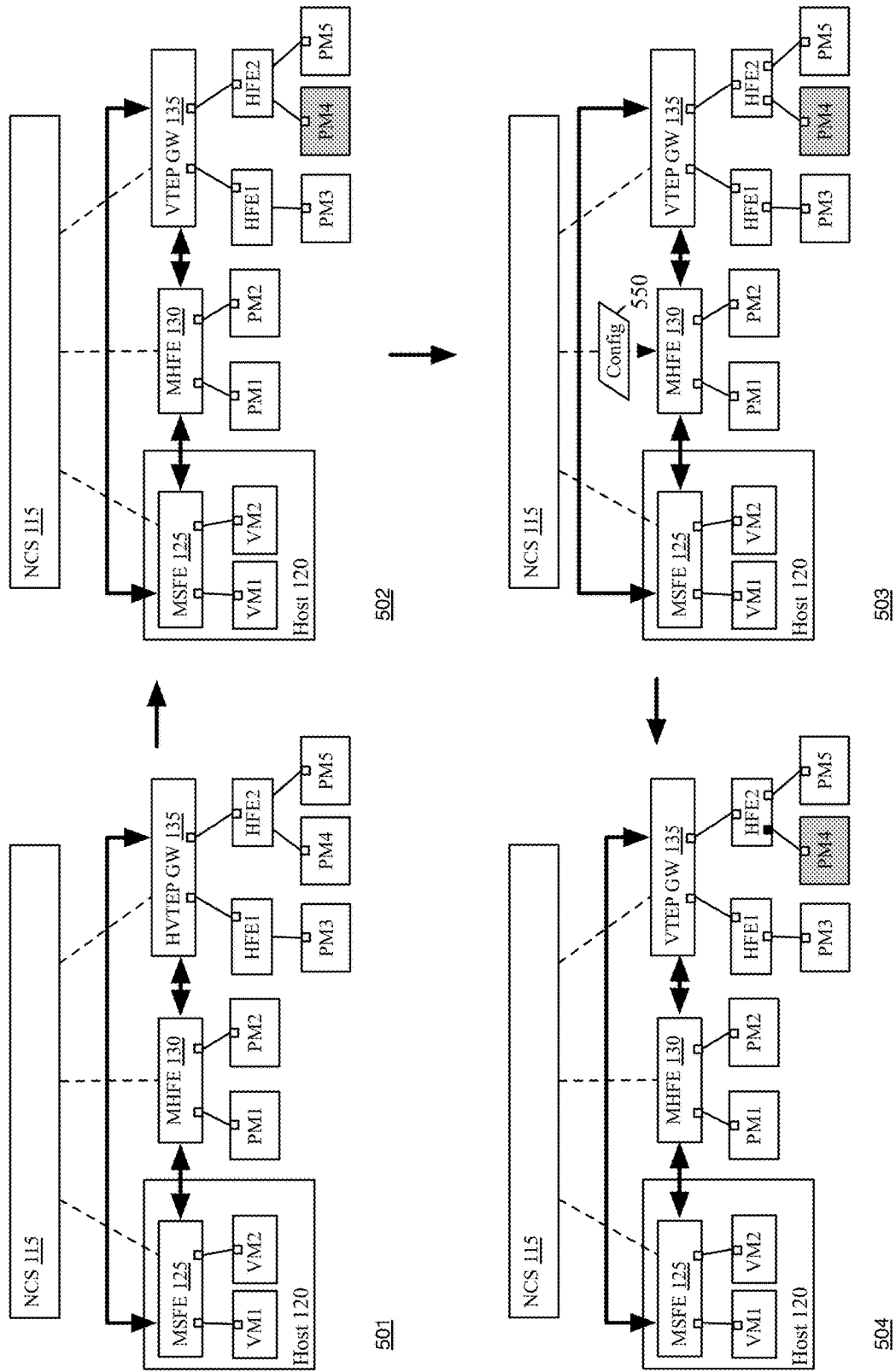
FIG. 5 illustrates an example of updating an administrative status of physical ports of a physical switch.

FIG. 5 illustrates an example of updating an administrative status of physical ports of a physical switch in four stages 501-504. Like the first stage 101 of FIG. 1, the first stage 501 shows the network control system 115 that manages MSFE 125, MHFE 130, and hardware VTEP gateway 135, which are virtual tunnel end points (VTEPs) for the tunnels (indicated as thick black arrows). VTEPs encapsulate and decapsulate data messages for a logical network through an overlay network.

In the second stage 502, physical machine PM4 has been identified as having a problem. For example, an administrator may determine that the machines are malicious or otherwise malfunctioning and need to be halted from further communication with the logical network. As shown, physical machine PM4 is connected to a hardware forwarding element HFE2, which connects to a hardware VTEP gateway 115. In addition to PM4, PM5 also connects to the same HFE2.

The third stage 503 shows that the network control system 115 sends a configuration message 550 to the hardware VTEP gateway 135 to disable PM4. However, rather than marking the entire VTEP or even the entire physical switch (HFE2) as administratively down, the network control system 115 of some embodiments configures the VTEP to mark an individual port of HFE2 (i.e., the port attached to the problem machine PM4) as being administratively down.

The network control system 115 uses the configuration database protocol (e.g., OVSDB protocol) to update an administrative status variable in the modified database schema. In this case, the modified database schema includes an administrative status variable for each individual port of the physical switches (i.e., HFE1 and HFE2) connected to the VTEP 135. Each physical switch may have multiple ports, and providing the administrative status column in the physical port table enables the network control system to operationally mark one or more ports of the physical switches as administratively down, without affecting the performance of the other physical ports or switches. In some embodiments, the modified configuration database schema includes a table (i.e., the Physical_Port table in the OVSDB schema) for each individual physical port for the physical switches served by the hardware VTEP. The schema of some embodiments is modified to include a Boolean field for the administrative status flag.

The single variable for each port allows the network control system 115 to mark individual ports as unavailable in a single step (by updating a single field in a physical port table), avoiding any inconsistencies in the forwarding state.

The fourth stage 504 shows that the port of HFE2 that connects to PM4 has been marked as administratively down (shown in black). The other machine PM5 connected to HFE2, and the other hardware forwarding element HFE2 that shares the hardware VTEP gateway 135 are still operational. The hardware VTEP gateway 135 maintains the tunnels to the MSFE 120 and the MHFE 130 for the logical network data of the end machines PM3 and PM5. In some embodiments, the network control system 115 does not do anything directly to HFE2, but simply marks the port of HFE2 as being administratively down and configures the VTEP to ignore traffic from the port that is marked as administratively down.

Figure 6:
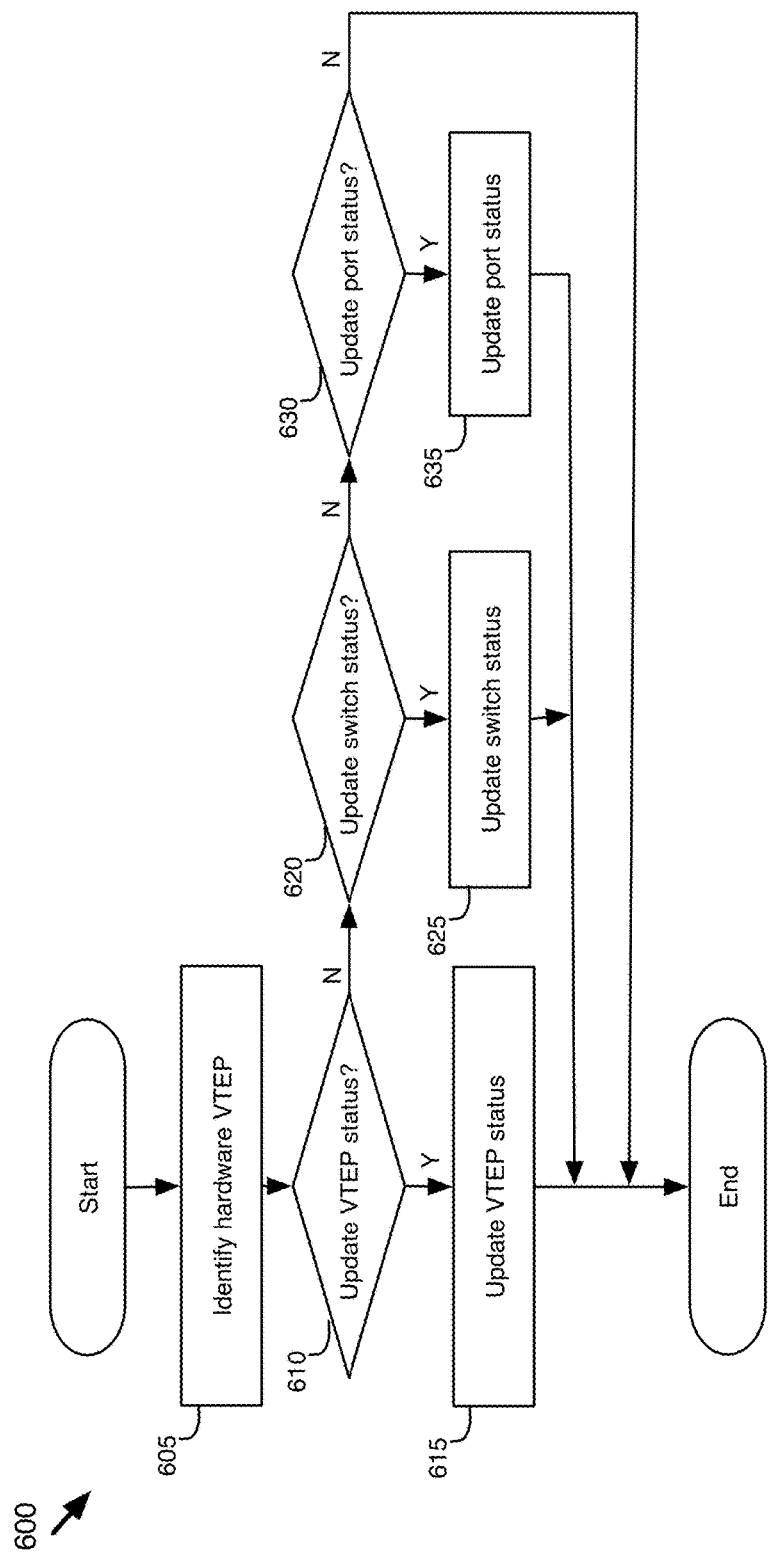
FIG. 6 conceptually illustrates a process for updating the statuses of a VTEP.

FIG. 6 conceptually illustrates a process for updating the statuses of a VTEP. The process 600 begins by identifying (at 605) a hardware VTEP. The identified hardware VTEP may be a VTEP that is having problems or other difficulties, or may be connected to machines that are having problems or have been identified as being malicious. In other cases, it may be a VTEP that has previously been marked as being administratively down and now needs to be restored.

The process 600 then determines (at 610) whether to update the status for the identified VTEP. Updating the status can include marking the identified VTEP as being administratively up or down. In some embodiments, the process 600 determines (at 610) to update the status for a VTEP when the source of a problem is not readily identified, or when the problem is spread throughout several end machines of the VTEP. When the process 600 determines (at 610) to update the status of the identified VTEP, the process 600 updates (at 615) the status of the identified VTEP. In some embodiments, updating the status of a VTEP includes updating a global administrative status variable in a global table of the configuration database for a VTEP.

When the process 600 determines (at 610) not to update the status of the identified VTEP (e.g., when the problem can be more specifically identified), the process 600 determines (at 620) whether to update the status of a physical switch within the identified VTEP. When the process 600 determines (at 620) to update the status of the physical switch, the process 600 updates (at 625) the status of the physical switch. In some embodiments, updating the status of a VTEP includes updating a global administrative status variable in a global table of the configuration database for a VTEP.

When the process 600 determines (at 620) not to update the status of the physical switch (e.g., when the problem can be more specifically identified to a single port), the process 600 determines (at 630) whether to update the status of a physical port for a physical switch within the identified VTEP. When the process 600 determines (at 630) to update the status of the physical port, the process 600 updates (at 635) the status of the physical switch. In some embodiments, updating the status of a VTEP includes updating a global administrative status variable in a global table of the configuration database for a VTEP. When the process 600 either updates the status of the VTEP, a physical switch, or a port of the physical switch, or determines (at 630) not to update the status of any element of the VTEP, the process ends.

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 7:
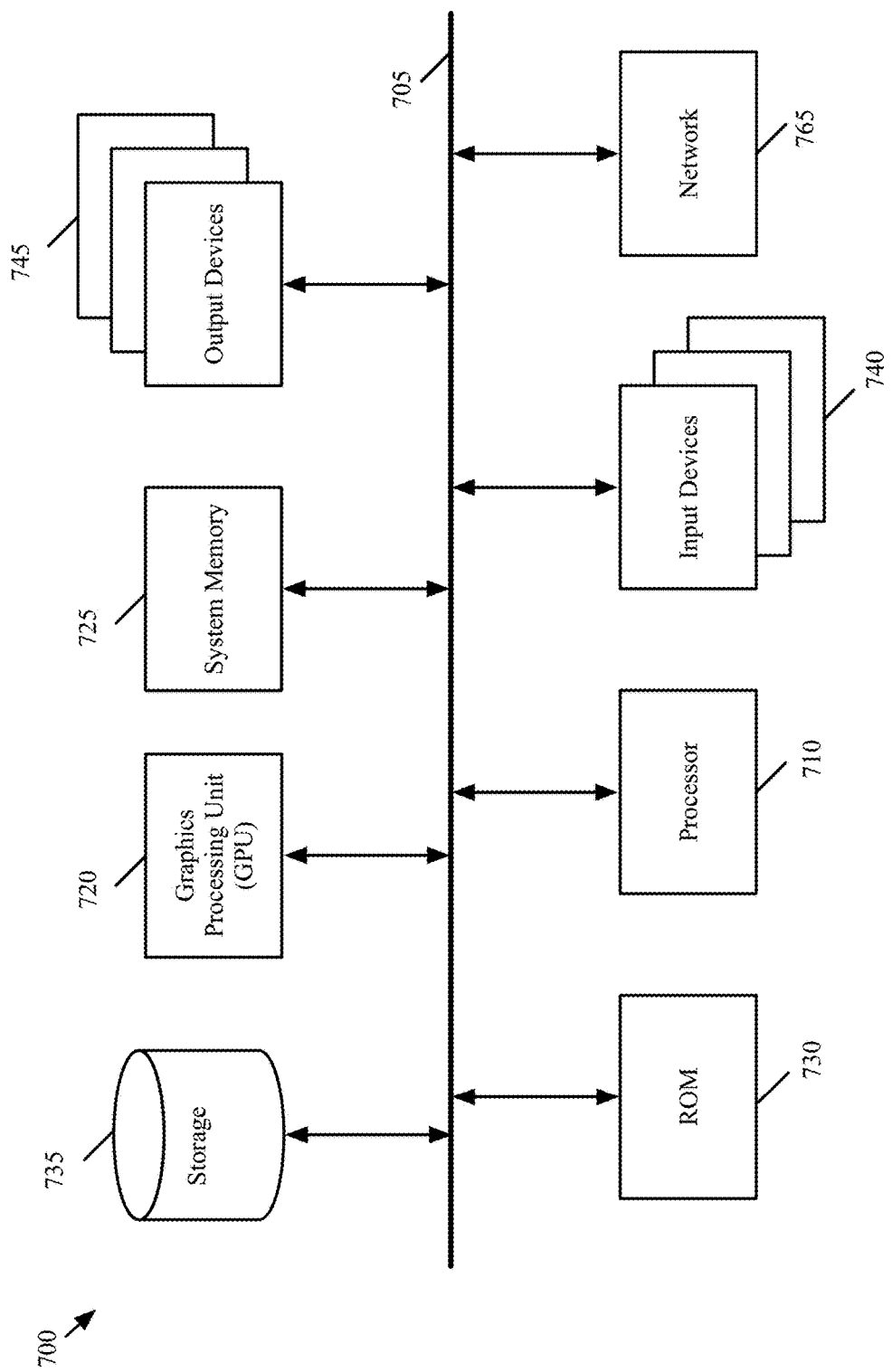
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash memory device, etc., and its corresponding drive) as the permanent storage device. Like the permanent storage device 735, the system memory 725 is a read-and-write memory device. However, unlike storage device 735, the system memory 725 is a volatile read-and-write memory, such a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieves instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"), cameras (e.g., webcams), microphones or similar devices for receiving voice commands, etc. The output devices 745 display images generated by the electronic system or otherwise output data. The output devices 745 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A non-transitory machine readable medium storing a program which when executed by at least one processing unit manages a set of hardware Virtual Tunnel End Points (VTEPs) used to implement a logical network, the logical network implemented on a set of hardware forwarding elements, the program comprising sets of instructions for:
    configuring a hardware VTEP forwarding element to implement a logical network, wherein the hardware VTEP forwarding element comprises an administrative status value for each of a plurality of elements associated with the hardware VTEP forwarding element;
    detecting a problem with an element associated with the logical network;
    identifying the particular hardware VTEP forwarding element as a hardware VTEP forwarding element that is associated with the element with the detected problem; and
    sending a configuration message to direct the particular hardware VTEP forwarding element to update the administrative status value of the element with the detected problem.

2. The non-transitory machine readable medium of claim 1, wherein the set of instructions for identifying the particular hardware VTEP forwarding element comprises a set of instructions for identifying one of a VTEP gateway and managed hardware forwarding element that is associated with the problem element.

3. The non-transitory machine readable medium of claim 2, wherein the problem element is a physical machine.

4. The non-transitory machine readable medium of claim 2, wherein the problem element is a physical forwarding element.

5. The non-transitory machine readable medium of claim 2, wherein the set of instructions for identifying an element as a problem element comprises a set of instructions for determining that the element is infected with a virus.

6. The non-transitory machine readable medium of claim 2, wherein the set of instructions for identifying an element as a problem element comprises a set of instructions for identifying a physical port to which the problem element is attached, wherein the set of elements to be updated comprises the physical port.

7. The non-transitory machine readable medium of claim 2, wherein the set of instructions for identifying an element as a problem element comprises a set of instructions for identifying a physical switch to which the problem element is attached, wherein the set of elements comprises the physical switch.

8. A method for managing a set of hardware Virtual Tunnel End Points (VTEPs) used to implement a logical network, the logical network implemented on a set of hardware forwarding elements, the method comprising:
    configuring a hardware VTEP forwarding element to implement a logical network, wherein the hardware VTEP forwarding element comprises an administrative status value for each of a plurality of elements associated with the hardware VTEP forwarding element;
    detecting a problem with an element associated with the logical network;
    identifying the particular hardware VTEP forwarding element as a hardware VTEP forwarding element that is associated with the element with the detected problem; and
    sending a configuration message to direct the particular hardware VTEP forwarding element to update the administrative status value of the element with the detected problem.

9. The method of claim 8, wherein identifying the particular hardware VTEP forwarding element comprises identifying one of a VTEP gateway and managed hardware forwarding element that is associated with the problem element.

10. The method of claim 9, wherein the problem element is a physical machine.

11. The method of claim 9, wherein the problem element is a physical forwarding element.

12. The method of claim 9, wherein identifying an element as a problem element comprises determining that the element is infected with a virus.

13. The method of claim 9, wherein identifying the particular hardware VTEP forwarding element that is associated with the problem element comprises identifying a physical port to which the problem element is attached, wherein the set of elements to be updated comprises the physical port.

14. The method of claim 9, wherein identifying the particular hardware VTEP forwarding element that is associated with the problem element comprises identifying a physical switch to which the problem element is attached, wherein the set of elements comprises the physical switch.

15. A device comprising:
a set of processing units; and
a non-transitory machine readable medium storing a program which when executed by the set of processing units manages a set of hardware Virtual Tunnel End Points (VTEPs) used to implement a logical network, the logical network implemented on a set of hardware forwarding elements, the program comprising sets of instructions for:
configuring a hardware VTEP forwarding element to implement a logical network, wherein the hardware VTEP forwarding element comprises an administrative status value for each of a plurality of elements associated with the hardware VTEP forwarding element;
detecting a problem with an element associated with the logical network;
identifying the particular hardware VTEP forwarding element as a hardware VTEP forwarding element that is associated with the element with the detected problem; and sending a configuration message to direct the particular hardware VTEP forwarding element to update the administrative status value of the element with the detected problem.

16. The device of claim 15, wherein the set of instructions for identifying the particular hardware VTEP forwarding element comprises a set of instructions for identifying one of a VTEP gateway and managed forwarding element that is associated with the problem element.

17. The device of claim 16, wherein the problem element is a physical machine.

18. The device of claim 16, wherein the problem element is a physical forwarding element.

19. The device of claim 16, wherein the set of instructions for identifying an element as a problem element comprises determining that the element is infected with a virus.

20. The device of claim 16, wherein the set of instructions for identifying the particular hardware VTEP forwarding element that is associated with the problem element comprises a set of instructions for identifying a physical port to which the problem element is attached, wherein the set of elements to be updated comprises the physical port.

21. The non-transitory machine readable medium of claim 1, wherein the updated administrative status value indicates that the problem element is not available.

* * * * *